(12) United States Patent
Chen et al.

(10) Patent No.: US 8,079,077 B2
(45) Date of Patent: Dec. 13, 2011

(54) SYSTEM AND METHOD FOR DISTRIBUTED MULTI-PROCESSING SECURITY GATEWAY

(75) Inventors: Lee Chen, Saratoga, CA (US); Ronald Wai Lun Szeto, Pleasanton, CA (US)

(73) Assignee: A10 Networks, Inc., San Jose, CA (US)

( * ) Notice: Subject to any disclaimer, the term of this patent is extended or adjusted under 35 U.S.C. 154(b) by 1035 days.

(21) Appl. No.: 11/947,755

(22) Filed: Nov. 29, 2007

(65) Prior Publication Data

US 2009/0049537 A1 Feb. 19, 2009

Related U.S. Application Data

(63) Continuation-in-part of application No. 11/501,607, filed on Aug. 8, 2006.

(51) Int. Cl.
*G06F 9/00* (2006.01)
*G06F 7/04* (2006.01)
*G06F 15/16* (2006.01)
*H04L 29/06* (2006.01)
*H04F 11/30* (2006.01)

(52) U.S. Cl. ............. 726/12; 726/4; 713/153; 713/189; 709/227

(58) Field of Classification Search .................. 726/4, 12
See application file for complete search history.

(56) References Cited

U.S. PATENT DOCUMENTS

| | | | |
|---|---|---|---|
| 6,167,428 A | 12/2000 | Ellis | |
| 7,111,162 B1* | 9/2006 | Bagepalli et al. | 713/151 |
| 7,568,041 B1* | 7/2009 | Turner et al. | 709/231 |
| 7,779,130 B1* | 8/2010 | Toutonghi | 709/227 |
| 2004/0243718 A1* | 12/2004 | Fujiyoshi | 709/237 |
| 2005/0050364 A1* | 3/2005 | Feng | 713/201 |
| 2005/0144468 A1* | 6/2005 | Northcutt et al. | 713/189 |
| 2006/0080446 A1* | 4/2006 | Bahl | 709/227 |
| 2006/0227771 A1 | 10/2006 | Raghunath et al. | |
| 2007/0011419 A1 | 1/2007 | Conti | |
| 2007/0180226 A1* | 8/2007 | Schory et al. | 713/153 |
| 2007/0180513 A1* | 8/2007 | Raz et al. | 726/12 |
| 2008/0034111 A1* | 2/2008 | Kamath et al. | 709/238 |
| 2008/0034419 A1* | 2/2008 | Mullick et al. | 726/15 |

* cited by examiner

*Primary Examiner* — Taghi Arani
*Assistant Examiner* — Morshed Mehedi
(74) *Attorney, Agent, or Firm* — North Shore Patents, P.C.; Michele Liu Baillie

(57) ABSTRACT

A system and method for a distributed multi-processing security gateway establishes a host side session, selects a proxy network address for a server, uses the proxy network address to establish a server side session, receives a data packet, assigns a central processing unit core from a plurality of central processing unit cores in a multi-core processor of the security gateway to process the data packet, processes the data packet according to security policies, and sends the processed data packet. The proxy network address is selected such that a same central processing unit core is assigned to process data packets from the server side session and the host side session. By assigning central processing unit cores in this manner, higher capable security gateways are provided.

13 Claims, 7 Drawing Sheets

SYSTEM AND METHOD FOR DISTRIBUTED MULTI-PROCESSING SECURITY GATEWAY

CROSS-REFERENCE TO RELATED APPLICATIONS

This application is a continuation-in-part of co-pending U.S. patent application entitled "System and Method for Distributed Multi-Processing Security Gateway", Ser. No. 11/501,607, filed on Aug. 8, 2006.

BACKGROUND

1. Field

This invention relates generally to data networking, and more specifically, to a system and method for a distributed multi-processing security gateway.

2. Related Art

Data network activities increases as more and more computers are connected through data networks, and more and more applications utilize the data networks for their functions. Therefore, it becomes more important to protect the data network against security breaches.

There are currently many security gateways such as firewalls, VPN firewalls, parental control appliances, email virus detection gateways, special gateways for phishing and spyware, intrusion detection and prevention appliances, access control gateways, identity management gateways, and many other types of security gateways. These products are typically implemented using a general purpose micro-processor such as Intel Pentium, an AMD processor or a SPARC processor, or an embedded micro-processor based on RISC architecture such as MIPS architecture, PowerPC architecture, or ARM architecture.

Micro-processor architectures are limited in their processing capability. Typically they are capable of handling up to a gigabit per second of bandwidth. In the past few years, data network bandwidth utilization increases at a pace faster than improvements of micro-processor capabilities. Today, it is not uncommon to see multi-gigabit per second of data network bandwidth utilization in many medium and large secure corporate data networks. It is expected such scenarios to become more prevailing in most data networks, including small business data network, residential networks, and service provider data networks.

The trend in the increasing usage of data networks illustrates a need for better and higher capable security gateways, particularly in using multiple processing elements, each being a micro-processor or based on micro-processing architecture, to work in tandem to protect the data networks.

SUMMARY

A system and method for a distributed multi-processing security gateway establishes a host side session, selects a proxy network address for a server, uses the proxy network address to establish a server side session, receives a data packet, assigns a central processing unit core from a plurality of central processing unit cores in a multi-core processor of the security gateway to process the data packet, processes the data packet according to security policies, and sends the processed data packet. The proxy network address is selected such that a same central processing unit core is assigned to process data packets from the server side session and the host side session. By assigning central processing unit cores in this manner, higher capable security gateways are provided.

DETAILED DESCRIPTION

Figure 1A:
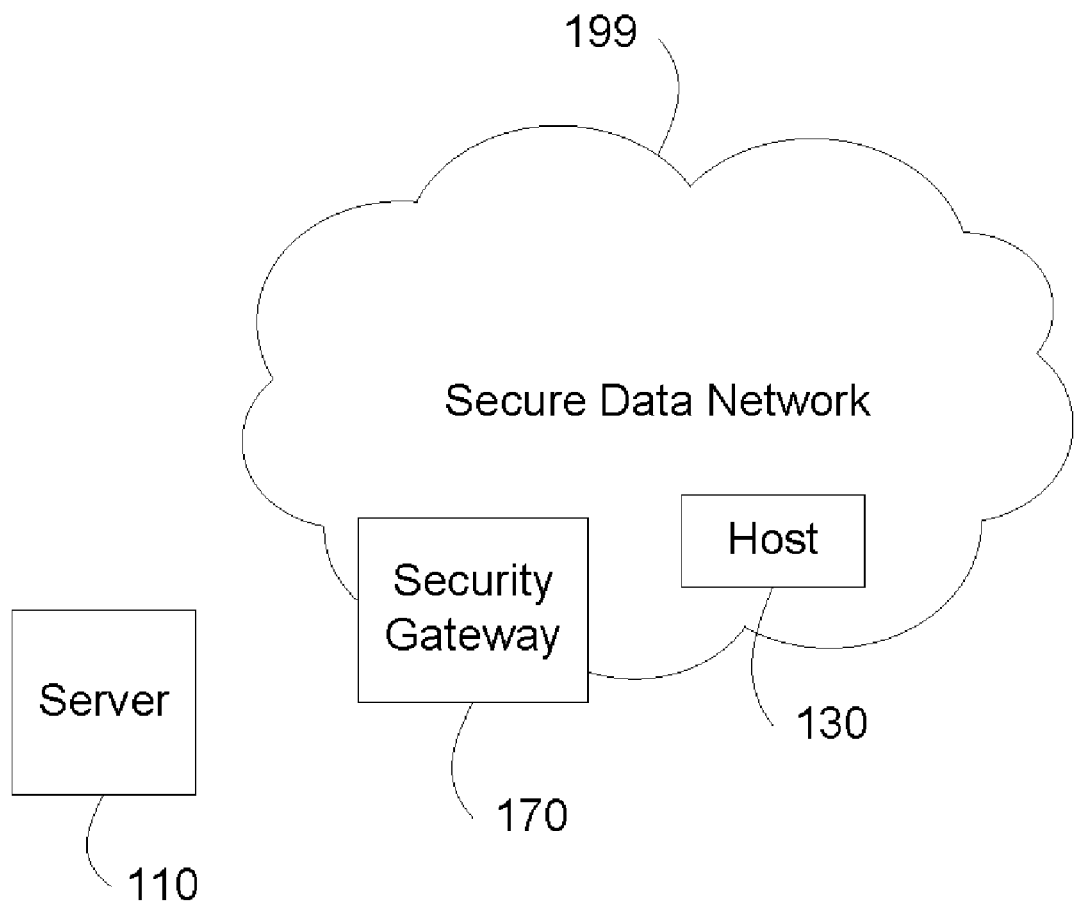
FIG. 1a illustrates a secure data network.

FIG. 1a illustrates a secure data network. Security gateway 170 protects a secure data network 199.

In one embodiment, secure data network 199 is a residential data network. In one embodiment, secure data network 199 is a corporate network. In one embodiment, secure data network 199 is a regional corporate network. In one embodiment, secure data network 199 is a service provider network.

In one embodiment, security gateway 170 is a residential broadband gateway. In one embodiment, security gateway 170 is a corporate firewall. In one embodiment, security gateway 170 is a regional office firewall or a department firewall. In one embodiment, security gateway 170 is a corporate virtual private network (VPN) firewall. In one embodiment, security gateway 170 is an Internet gateway of a service provider network.

When host 130 inside secure data network 199 accesses a server 110 outside secure data network 199, host 130 establishes a session with server 110 through security gateway 170. Data packets exchanged within the session, between host 130 and server 110, pass through security gateway 170. Security gateway 170 applies a plurality of security policies during processing of the data packets within the session. Examples of security policies include network address protection, content filtering, virus detection and infestation prevention, spyware or phishing blocking, network intrusion or denial of service prevention, data traffic monitoring, or data traffic interception.

Figure 1B:
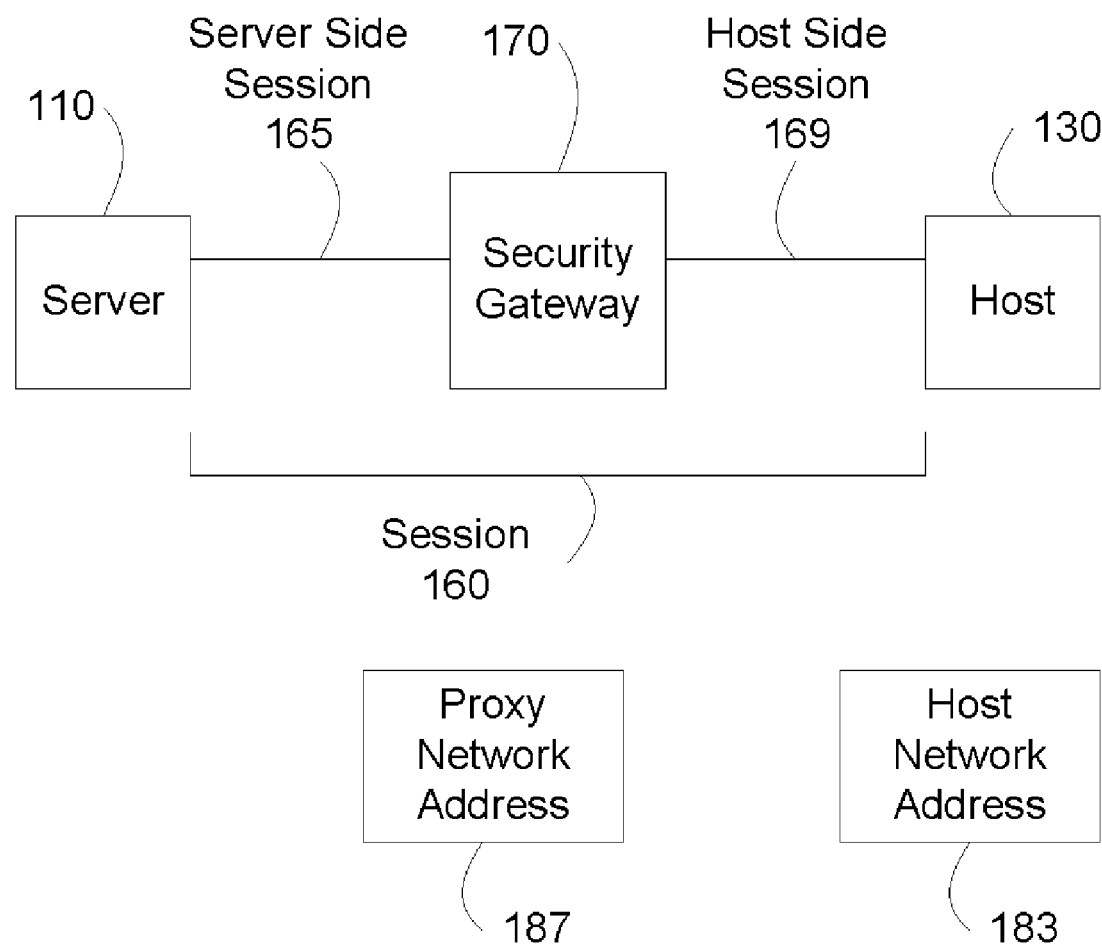
FIG. 1b illustrates an overview of a network address translation (NAT) process.

FIG. 1b illustrates an overview of a network address translation (NAT) process.

In one embodiment, a security policy is to protect network address of host 130. Host 130 uses a host network address 183 in a session 160 between host 130 and server 110. In one embodiment, the host network address 183 includes an IP address of host 130. In another embodiment, the host network address 183 includes a session port address of host 130.

Security gateway 170 protects host 130 by not revealing the host network address 183. When host 130 sends a session request for session 160 to security gateway 170, the session request includes host network address 183.

Security gateway 170 establishes host side session 169 with host 130. Host 130 uses host network address 183 in session 169.

Security gateway 170 selects a proxy network address 187. Security gateway 170 uses proxy network address 187 to establish server side session 165 with server 110.

Server side session 165 is the session between security gateway 170 and server 110. Host side session 169 is the session between security gateway 170 and host 130. Session 160 includes server side session 165 and host side session 169.

Security gateway 170 performs network address translation (NAT) process on session 160. Security gateway 170 performs network address translation process on data packets received on server side session 165 by substituting proxy network address 187 with host network address 183. Security gateway 170 transmits the translated data packets onto host side session 169. Similarly, security gateway 170 performs network address translation process on data packets received on host side session 169 by substituting host network address 183 with proxy network address 187. Security gateway 170 transmits the translated data packets onto server side session 165.

In one embodiment, session 160 is a transmission control protocol (TCP) session. In one embodiment, session 160 is a user datagram protocol (UDP) session. In one embodiment, session 160 is an internet control messaging protocol (ICMP) session. In one embodiment, session 160 is based on a transport session protocol on top of IP protocol. In one embodiment, session 160 is based on an application session protocol on top of IP protocol.

Figure 1C:
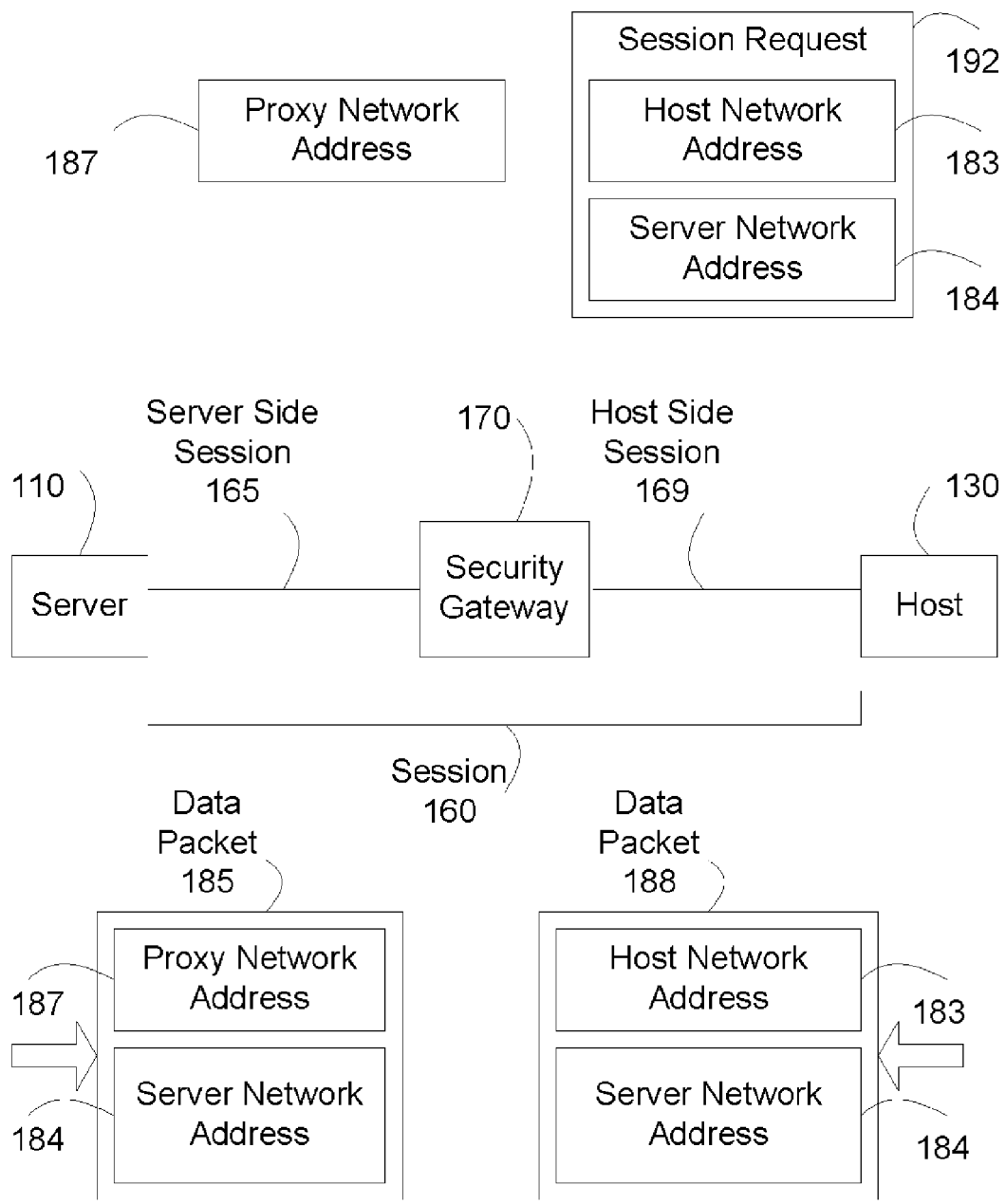
FIG. 1 illustrates a NAT process for a TCP session.

FIG. 1c illustrates a NAT process for a TCP session.

Host 130 sends a session request 192 for establishing a session 160 with server 110. Session 160 is a TCP session. Session request 192 includes host network address 183 and server network address 184. Security gateway 170 receives session request 192. Security gateway 170 extracts host network address 183 from session request 192. Security gateway 170 determines a proxy network address 187. In one embodiment, host network address 183 includes a host's IP address, and security gateway 170 determines a proxy IP address to substitute host's IP address. In one embodiment, host network address 183 includes a host's TCP port number, and security gateway 170 determines a proxy TCP port number to substitute host's TCP port number. Security gateway 170 extracts server network address 184 from session request 192. Security gateway 170 establishes a server side session 165 with server 110 based on server network address 184 and proxy network address 187. Server side session 165 is a TCP session.

Security gateway 170 also establishes a host side session 169 with host 130 by responding to session request 192.

After establishing server side session 165 and host side session 169, security gateway 170 processes data packets from server side session 165 and host side session 169.

In one embodiment, security gateway 170 receives a data packet 185 from server side session 165. Data packet 185 includes server network address 184 and proxy network address 187. Security gateway 170 extracts server network address 184 and proxy network address 187. Security gateway 170 determines host side session 169 based on the extracted network addresses. Security gateway 170 further determines host network address 183 from host side session 169. Security gateway 170 modifies data packet 185 by first substituting proxy network address 187 with host network address 183. Security gateway 170 modifies other parts of data packet 185, such as TCP checksum, IP header checksum. In one embodiment, security gateway 170 modifies payload of data packet 185 by substituting any usage of proxy network address 187 with host network address 183.

After security gateway 170 completes modifying data packet 185, security gateway 170 transmits the modified data packet 185 onto host side session 169.

In a similar fashion, security gateway 170 receives a data packet 188 from host side session 169. Data packet 188 includes server network address 184 and host network address 183. Security gateway 170 extracts server network address 184 and host network address 183. Security gateway 170 determines server side session 165 based on the extracted network addresses. Security gateway 170 further determines proxy network address 187 from server side session 165. Security gateway 170 modifies data packet 188 by first substituting host network address 183 with proxy network address 187. Security gateway 170 modifies other parts of data packet 188, such as TCP checksum, IP header checksum. In one embodiment, security gateway 170 modifies payload of data packet 188 by substituting any usage of host network address 183 with proxy network address 187.

After security gateway 170 completes modifying data packet 188, security gateway 170 transmits the modified data packet 188 onto server side session 165.

Figure 2:
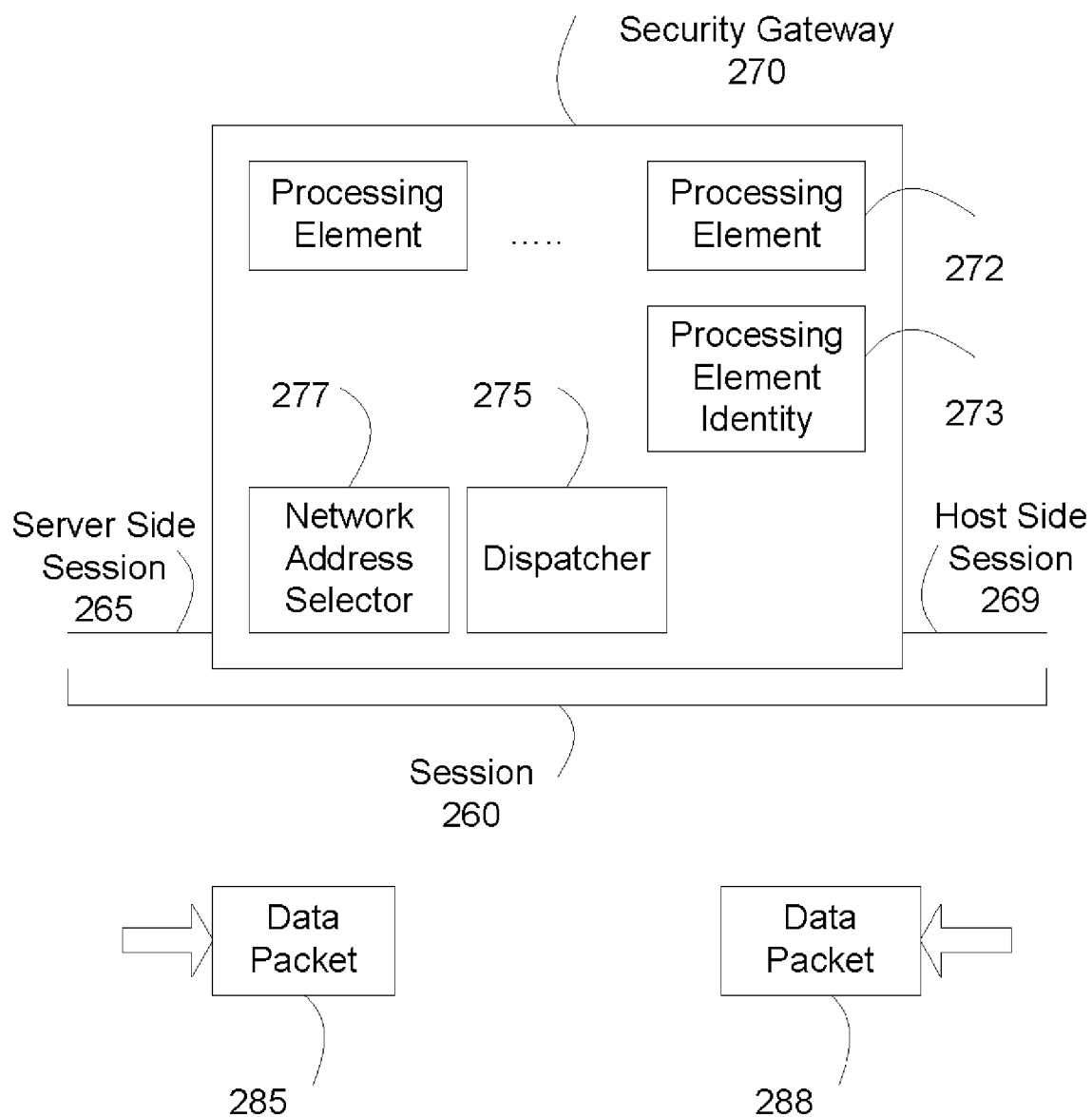
FIG. 2 illustrates a distributed multi-processing security gateway.

FIG. 2 illustrates a distributed multi-processing security gateway.

In one embodiment, security gateway 270 is a distributed multi-processing system. Security gateway 270 includes a plurality of processing elements. A processing element 272 includes a memory module. The memory module stores host network addresses, proxy network addresses and other information for processing element 272 to apply security policies as described in FIG. 1. Processing element 272 has a processing element identity 273.

Figure 5:
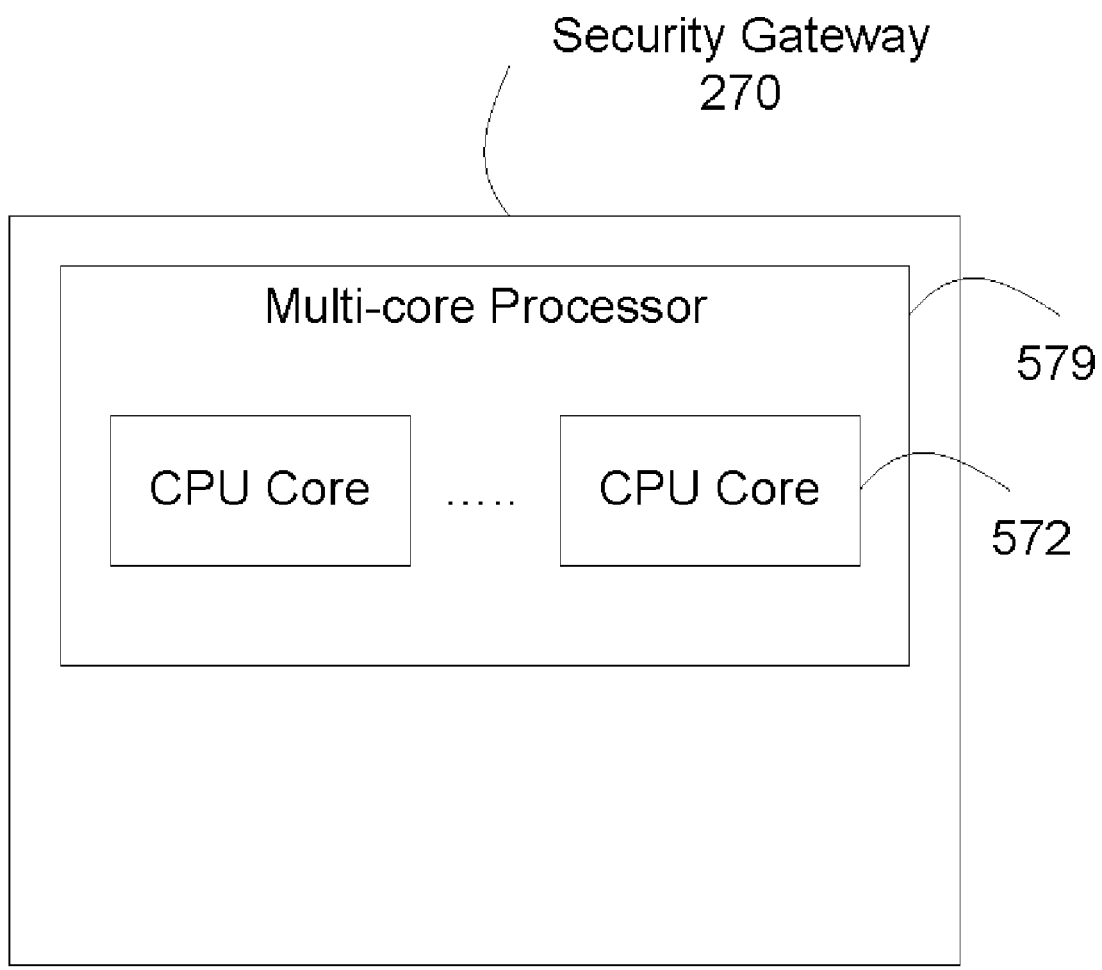
FIG. 5 illustrates a multi-processor core embodiment of the invention.

In one embodiment illustrated in FIG. 5, processing element 272 is a central processing unit (CPU) core 572 in a multi-core processor 579 which combines two or more independent cores. In one embodiment, multi-core processor 579 is a dual-core processor such as Intel's Core 2 Duo processor, or AMD's Athlon dual-core processor. In one embodiment, multi-core processor 579 is a quad-core processor such as Intel's quad-core Xeon 5300 series processor, or AMD's Opteron Quad-Core processor.

In one embodiment, security gateway 270 includes a plurality of multi-core processors, wherein processing element 272 is a multi-core processor.

In one embodiment, processing element 272 is a packet processing module within a network processor, such as Intel's IXP2855 or IXP2805 network processor. AMD's Au1500 processor, or Cavium's Octeon MIPS64 network processor.

Security gateway 270 includes a dispatcher 275. Dispatcher 275 receives a data packet and determines a processing element to process the data packet. Dispatcher 275 typically calculates a processing element identity based on the data packet. Based on the calculated processing element identity, security gateway 270 assigns the data packet to the identified processing element for processing.

In one embodiment, dispatcher 275 receives a data packet 288 from host side session 269 and calculates a first processing element identity based on the host network address and server network address in data packet 288. In another embodiment dispatcher 275 receives a data packet 285 from server side session 265 and calculates a second processing element identity based on the proxy network address and server network address in data packet 285.

Security gateway 270 includes a network address selector 277. Network address selector 277 selects a proxy network address based on network information. The network information includes a host network address obtained in a session request for session 260 and a security gateway network address. Other types of network information may also be used. The proxy network address is used to establish server side session 265. The proxy network address is selected such that the first processing element identity and the second processing element identity calculated by dispatcher 275 are the same. In other words, a same processing element is assigned to process data packet 285 from server side session 265 and data packet 288 from host side session 269.

In one embodiment, the proxy network address is selected such that the first processing element identity calculated by dispatcher 275 identifies a processing element that has the lightest load among the plurality of processing elements. In one embodiment, the load is based on processor idle time of the processing element. In one embodiment, the load is based on active sessions for the processing element. In one embodiment, network address selector 277 obtains load from a processing element over an Application Programming Interface (API). In one embodiment, network address selector 277 obtains load from the memory module of a processing element. In one embodiment, the proxy network address is selected such that the second processing element identity calculated by dispatcher 275 identifies a processing element that has the lightest load among the plurality of processing elements.

In one embodiment, the proxy network address is selected such that the first processing element identity calculated by dispatcher 275 identifies a processing element with a functional role. In one embodiment, the function role includes the processing of a security policy. In one embodiment, network address selector 277 obtains the function role of a processing element through a registration process, or an Application Programming Interface (API). In one embodiment, network address selector 277 obtains the functional role from the memory module of the processing element.

Figure 3:
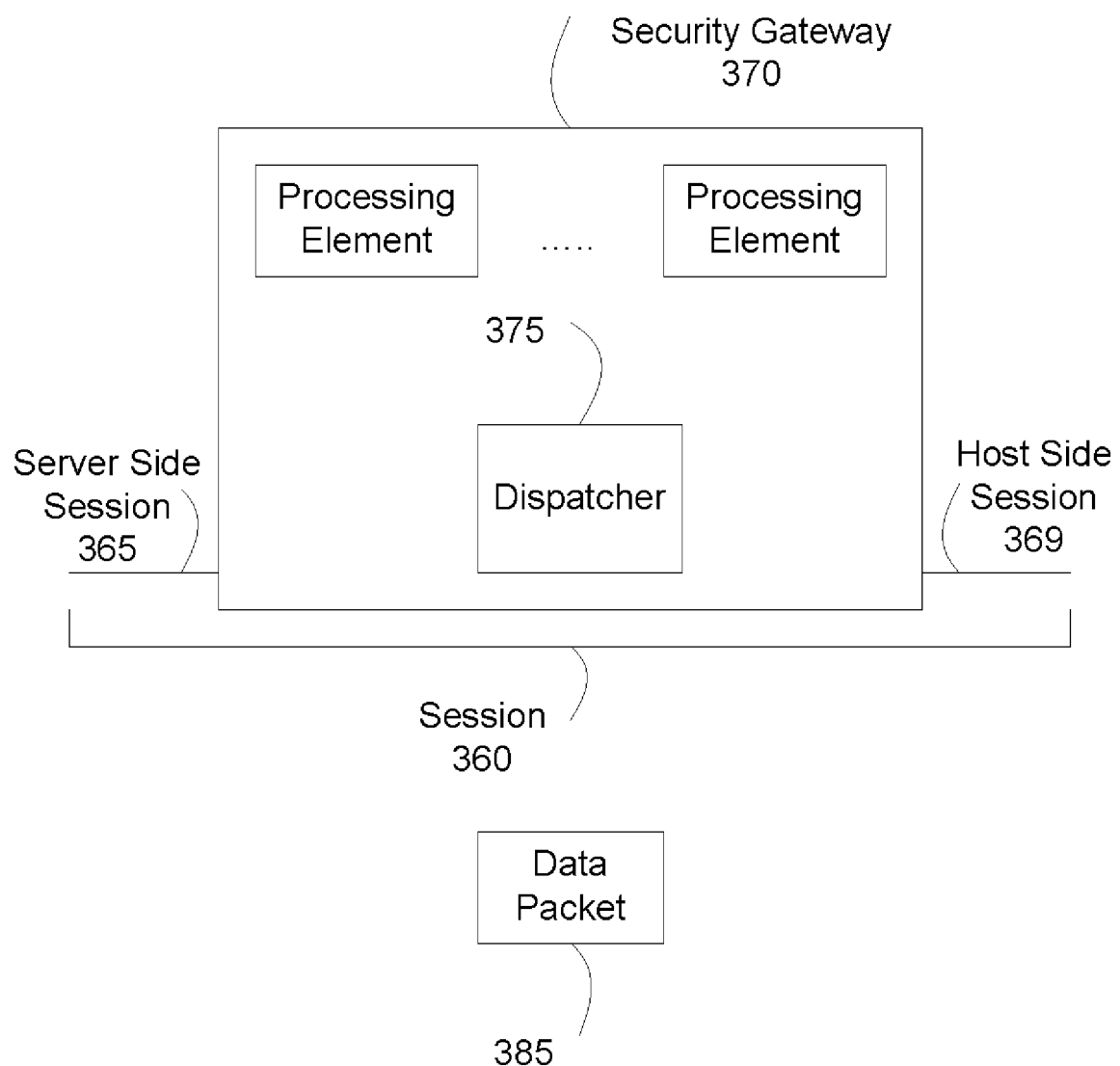
FIG. 3 illustrates a dispatching process.

FIG. 3 illustrates a dispatching process.

Dispatcher 375 calculates a processing element identity based on two network addresses obtained from a data packet 385 of session 360. Session 360 includes host side session 369 and server side session 365. The two network addresses of host side session 369 are server network address and host network address. The two network addresses of server side session 365 are proxy network address and server network address. Dispatcher 375 calculates to the same processing element identity for host side session 369 and server side session 365.

In one embodiment, dispatcher 375 calculates based on a hashing function.

In one embodiment, dispatcher 375 computes a sum by adding the two network addresses. In one example, dispatcher 375 computes a sum by performing a binary operation, such as an exclusive or (XOR) binary operation, or an and (AND) binary operation, onto the two network addresses in binary number representation. In one example, dispatcher 375 computes a sum by first extracting portions of the two network addresses, such as the first 4 bits of a network address, and applies an operation such as a binary operation to the extracted portions. In one example, dispatcher 375 computes a sum by first multiplying the two network addresses by a number, and by applying an operation such as addition to the multiple.

In one embodiment, dispatcher 375 computes a processing element identity by processing on the sum. In one embodiment, there are 4 processing elements in security gateway 370. In one example, dispatcher 375 extracts the first two bits of the sum, and interprets the extracted two bits as a numeric number between 0 and 3. In one example, dispatch 375 extracts the first and last bit of the sum, and interprets the extracted two bits as a numeric number between 0 and 3. In one example, dispatcher 375 divides the sum by 4 and determines the remainder of the division. The remainder is a number between 0 and 3.

In one embodiment, security gateway 370 includes 8 processing elements. Dispatcher 375 extracts 3 bits of the sum and interprets the extracted three bits as a numeric number between 0 and 7. In one example, dispatcher 375 divides the sum by 8 and determines the remainder of the division. The remainder is a number between 0 and 7.

In one embodiment, a network address includes an IP address and a session port address. Dispatcher 375 computes a sum of the IP addresses and the session port addresses of the two network addresses.

Though the teaching is based on the above description of hashing functions, it should be obvious to the skilled in the art to implement a different hashing function for dispatcher 375.

Figure 4:
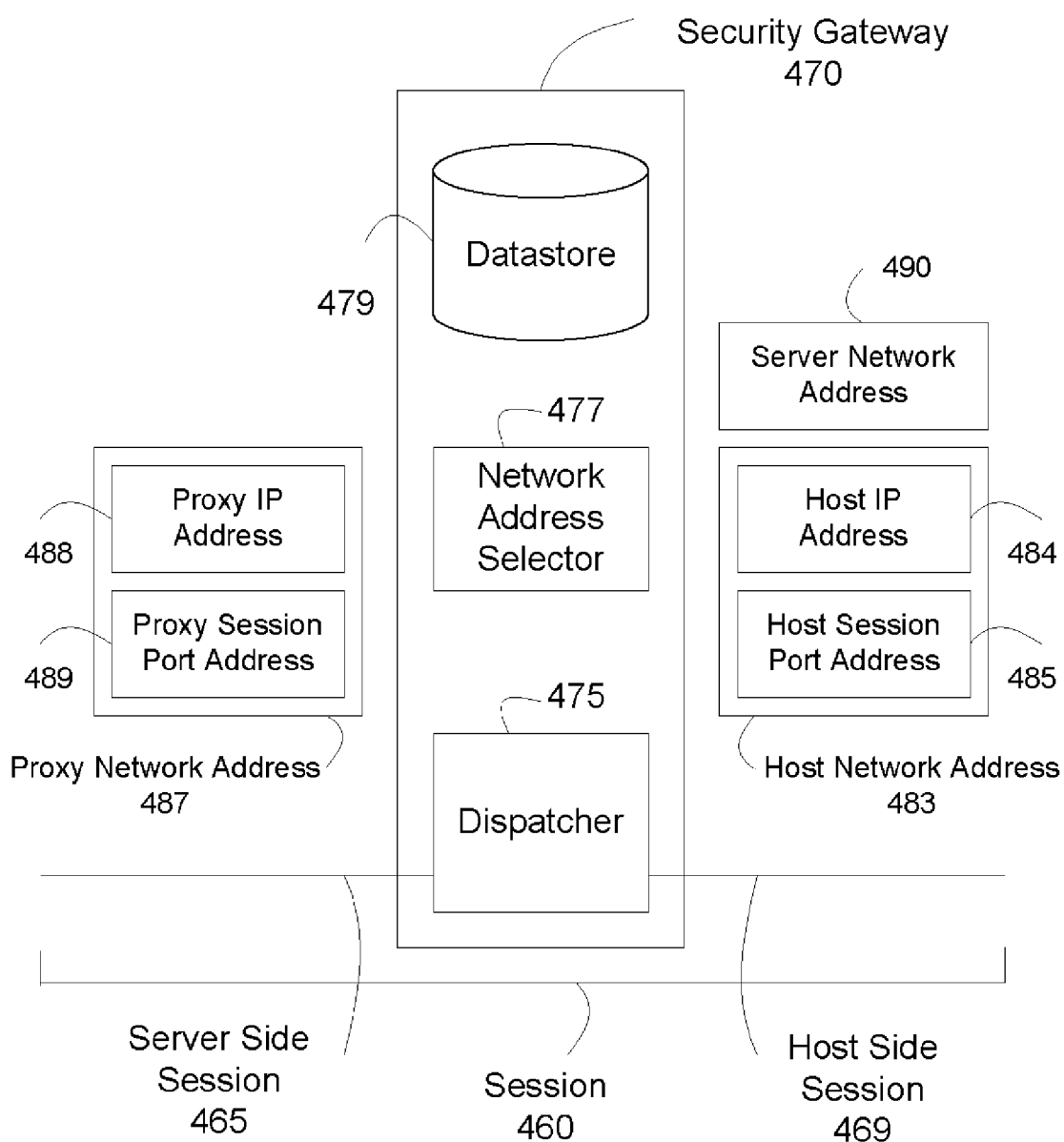
FIG. 4 illustrates a proxy network address selection process.

FIG. 4 illustrates a proxy network address selection process.

Network address selector 477 selects a proxy network address 487 for a host network address 483. In one embodiment, host network address 483 includes a host IP address 484 and a host session port address 485; proxy network address 487 includes a proxy IP address 488 and a proxy session port address 489. Proxy network address 487 is selected such that dispatcher 475 calculates to the same processing element identity on host side session 469 and server side session 465.

In one embodiment, the selection process is based on the dispatching process, illustrated in FIG. 3. In one example, dispatcher 475 uses the method of computing the sum of two IP addresses, and two session port addresses, and then divides the sum by 4. In one embodiment, network address selector 477 first selects proxy IP address 488. Network address selector 477 then selects proxy session port address 489 such that when using the method on server network address 490 and host network address 483 dispatcher 475 calculates the same processing element identity as when using the method on server network address 490 and proxy network address 487.

In one example, dispatcher 475 computes a sum from a binary operator XOR of the two network addresses, and extracts the last 3 digits of the sum. Network address selector 477 selects a proxy session port address 489 that has the same last 3 digits of the host session port address 485.

In one embodiment, security gateway 470 performs network address translation process for a plurality of existing sessions. Network address selector 477 checks if the selected proxy network address 487 is not used in the plurality of existing sessions. In one embodiment, security gateway 470 includes a datastore 479. Datastore 479 stores a plurality of proxy network addresses used in a plurality of existing sessions. Network address selector 477 determines the selected proxy network address 487 is not used by comparing the selected proxy network address 487 against the stored plurality of proxy network addresses and not finding a match.

In one embodiment, a processing element includes network address selector. A processing element receives a data packet assigned by security gateway based on a processing element identity calculated by dispatcher. In one embodiment, the processing element determines that the data packet includes a session request. The network address selector in the processing element selects a proxy network address based on the host network address in the session request as illustrated in FIG. 4.

In one embodiment, a particular first processing element includes network address selector. A second processing element without network address selector receives a data packet and determines that the data packet includes a session request. The second processing element sends the data packet to the first processing element using, for example, a remote function call. The first processing element receives the data packet. The network address selector selects a proxy network address based on the host network address in the session request.

In one embodiment, datastore is implemented in the memory module of a processing element. In one embodiment, the plurality of proxy network addresses in datastore are stored in each of the memory modules of each of the processing elements. In one embodiment, the plurality of proxy network addresses in datastore are stored in the memory modules in a distributive manner, with the proxy network addresses used in the sessions processed by a processing element stored in the memory module of the processing element.

In one embodiment, security gateway includes a memory shared by the plurality of processing elements. Security gateway partitions the shared memory into memory regions. A processing element has access to a dedicated memory region, and does not have access to other memory regions.

In one embodiment, security gateway includes a central processing unit. In one embodiment, the central process unit includes a plurality of processing threads such as hyper-thread, micro-engine or other processing threads implemented in circuitry such as application specific integrated circuit (ASIC) or field programmable gate array (FPGA). A processing element is a processing thread.

In one embodiment, a central processing unit includes a plurality of micro-processor cores. A processing thread is a micro-processor core.

In one embodiment, a security policy is for virus detection or blocking. In one embodiment, a security policy is for phishing detection or blocking. In one embodiment, a security policy is for traffic quota enforcement. In one embodiment, a security policy is for lawful data interception.

In one embodiment, the NAT process is for a UDP session. In one embodiment, security gateway receives a UDP packet. In one embodiment, security gateway determines that the UDP packet is not from an existing session. Security gateway processes the UDP packet as a session request.

In one embodiment, the NAT process is for an ICMP session. In a similar fashion, security gateway processes an ICMP packet from a non-existing session as a session request.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A method for providing a security gateway, comprising:
   (a) establishing by the security gateway a host side session between the security gateway and a host, the security gateway comprising a multi-core processor comprising a plurality of central processing unit (CPU) cores;
   (b) selecting by the security gateway a proxy network address for a host based on a combination of network addresses for the host side session to result in a calculated first CPU core identity of a first CPU core of the multi-core processor being the same as a calculated second CPU core identity of a second CPU core of the multi-core processor;
   (c) using the proxy network address to establish by the security gateway a server side session between the security gateway and the server;
   (d) in response to receiving a first data packet from the host side session, calculating by the security gateway the first CPU core identity and assigning the first CPU core with the first CPU core identity to process data packets received from the host side session according to security policies;
   (e) in response to receiving a second data packet from the server side session, calculating by the security gateway the second CPU core identity from a server network address and the proxy network address in the second data packet;
   (f) assigning the second CPU core with the second CPU core identity to process data packets received from the server side session according to the security policies;
   (g) processing the second data packet according to the security policies by the second CPU core;
   (h) substituting the proxy network address in the processed second data packet with the host network address by the security gateway; and
   (i) sending the processed second data packet to the host side session.

2. The method of claim 1, wherein the calculating (d) comprises:
   (d1) calculating the first CPU core identity from a server network address and a host network address in the first data packet; and
   (d2) assigning processing of the first data packet according to the security policies to the first CPU core with the first CPU core identity.

3. The method of claim 2, further comprising:
   (g) processing the first data packet according to the security policies by the first CPU core;
   (h) substituting the host network address in the processed first data packet with the proxy network address by the security gateway; and
   (i) sending the processed first data packet to the server side session.

4. The method of claim 1, wherein the selecting (e) is further based on loads of the plurality of central processing unit cores.

5. The method of claim 4, wherein the first central processing unit core has a lightest load among the plurality of central processing unit cores.

6. The method of claim 1, wherein the selecting (e) is further based on functional roles of the plurality of central processing unit cores.

7. A security gateway, comprising:
   a plurality of central processing unit (CPU) cores in a multi-core processor;
   a network address selector for receiving a session request for a session between a host and a server, for selecting a proxy network address for the host based on a combination of network addresses for a host side session between the host and the security gateway to result in a calculated first CPU core identity of a first CPU core of the multi-core processor being the same as a calculated second CPU core identity of a second CPU core of the multi-core processor, and for establishing a server side session between the security gateway and the server using the proxy network address; and
   a dispatcher for:
   calculating the first CPU core identity in response to receiving a first data packet from the host side session and assigning the first CPU core with the first CPU core identity to process data packets received form the host side session according to security policies,
   calculating the second CPU core identity from a server network address and the proxy network address in the second data packet, in response to receiving a second data packet from the server side session,
   assigning the second CPU core with the second CPU core identity to process data packets received from the server side session according to the security policies,
   receiving the processed second data packet from the second CPU core, substituting the proxy network address in the processed second data packet with the host network address, and sending the processed second data packet to the host side session.

8. The security gateway of claim 7, wherein the dispatcher:

calculates the first CPU core identity from a server network address and a host network address in the first data packet; and assigns processing of the first data packet according to the security policies to the first CPU core with the first CPU core identity.

9. The security gateway of claim 8, wherein the dispatcher further:

receives the processed first data packet from the first CPU core;

substitutes the host network address in the processed first data packet with the proxy network address; and sends the processed first data packet to the server side session.

10. The security gateway of claim 7, further comprising a datastore for storing proxy network addresses for existing sessions, wherein the network address selector determines the proxy network address is not used in an existing session by comparing the proxy network address against addresses in the datastore, wherein the network address selector selects the proxy network address based on the combination of network addresses for the host side session.

11. The security gateway of claim 7, wherein the selecting of the proxy network address is further based on loads of the plurality of central processing unit cores.

12. The security gateway of claim 11, wherein the first central processing unit core has a lightest load among the plurality of central processing unit cores.

13. The method of claim 7, wherein the selecting of the proxy network address is further based on functional roles of the plurality of central processing unit cores.

* * * * *